US012615192B2

(12) United States Patent
Sung et al.

(10) Patent No.: US 12,615,192 B2
(45) Date of Patent: Apr. 28, 2026

(54) METHOD OF SUPPORTING REINFORCEMENT LEARNING IN MOBILE COMMUNICATION SYSTEM AND DEVICES FOR PERFORMING THE SAME

(71) Applicant: Electronics and Telecommunications Research Institute, Daejeon (KR)

(72) Inventors: Jihoon Sung, Daejeon (KR); Myung Ki Shin, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/784,793

(22) Filed: Jul. 25, 2024

(65) Prior Publication Data

US 2025/0039064 A1 Jan. 30, 2025

(30) Foreign Application Priority Data

Jul. 25, 2023 (KR) ........................ 10-2023-0096939

(51) Int. Cl.
| | |
|---|---|
| *G06F 15/173* | (2006.01) |
| *H04L 41/14* | (2022.01) |
| *H04L 41/16* | (2022.01) |

(52) U.S. Cl.
CPC .............. *H04L 41/16* (2013.01); *H04L 41/14* (2013.01)

(58) Field of Classification Search
CPC ................................ H04L 41/16; H04L 41/14
See application file for complete search history.

(56) References Cited

U.S. PATENT DOCUMENTS

| | | | |
|---|---|---|---|
| 2017/0303259 A1 | 10/2017 | Lee et al. | |
| 2019/0230556 A1 | 7/2019 | Lee | |
| 2022/0108214 A1* | 4/2022 | Lee ...................... | H04W 48/18 |
| 2023/0041242 A1 | 2/2023 | Mannor et al. | |
| 2024/0241486 A1* | 7/2024 | Joo ...................... | G05B 13/047 |

FOREIGN PATENT DOCUMENTS

WO WO-2024027921 A1 * 2/2024 ............. G06N 3/092

* cited by examiner

*Primary Examiner* — Padma Mundur
(74) *Attorney, Agent, or Firm* — BROADVIEW IP LAW, PC

(57) ABSTRACT

A method of supporting reinforcement learning (RL) in a mobile communication system and devices for performing the same are disclosed. The method of supporting RL in a mobile communication system includes receiving a subscription request to train an RL model from a consumer network function (NF), training the RL model by collecting data in response to the subscription request, and when training of the RL model is completed based on a training completion condition, transmitting a notification including RL model information to the consumer NF.

14 Claims, 6 Drawing Sheets

METHOD OF SUPPORTING REINFORCEMENT LEARNING IN MOBILE COMMUNICATION SYSTEM AND DEVICES FOR PERFORMING THE SAME

CROSS-REFERENCE TO RELATED APPLICATION

This application claims the benefit of Korean Patent Application No. 10-2023-0096939 filed on Jul. 25, 2023, and Korean Patent Application No. 10-2024-0086340 filed on Jul. 1, 2024, in the Korean Intellectual Property Office, the entire disclosures of which are incorporated herein by reference for all purposes.

BACKGROUND

1. Field of the Invention

The following disclosure relates to a method of supporting reinforcement learning in a mobile communication system and devices for performing the same.

2. Description of the Related Art

To support network automation, a fifth generation (5G) telecommunication system defines a network data analytics function (NWDAF) that is a network function for providing a function to analyze data collected by the 5G network.

For automation and optimization of the 5G telecommunication system, the NWDAF may collect raw data of each network function and application function, may convert the raw data into big data, and may provide network analytics information by processing the big data.

The network analytics information provided by the NWDAF may be information on statistics and predictions based on a bulk of collected data and may not provide an operation recommendation function required for the actual system automation. Accordingly, there is an increasing demand for adopting a reinforcement learning technique of an artificial intelligence field to provide a function to recommend a specific operation for a currently given state.

The above description is information the inventor(s) acquired during the course of conceiving the present disclosure, or already possessed at the time, and is not necessarily art publicly known before the present application was filed.

SUMMARY

For reinforcement learning, it may be required to determine whether a specific operation is an optimal operation in a given state. However, since functions to provide and manage reward information in response to performing the specific operation are not supported in a mobile communication system, an operation of recommendation function may not be provided.

Embodiments provide a technique for a network data analytics function (NWDAF) to support an operation of recommendation function required for system automation.

However, the technical aspects are not limited to the aforementioned aspects, and other technical aspects may be present.

According to an embodiment, a method of supporting reinforcement learning (RL) in a mobile communication system includes receiving a subscription request to train an RL model from a consumer network function (NF), training the RL model by collecting data in response to the subscription request, and when training of the RL model is completed based on a training completion condition, transmitting a notification including RL model information to the consumer NF.

The subscription request includes parameters that the consumer NF is able to provide.

The parameters include an expected RL training completion time, an expected RL training completion condition other than time, an expected RL model confidence level, an expected reward, a candidate action space, an RL model update period, an RL preparation flag, an RL correlation identifier (ID), and an available data requirement.

The RL preparation flag is for identifying whether the subscription request is for preparing RL or executing RL, and the RL correlation ID is for identifying an RL procedure for RL model training.

The training completion condition includes at least one of the number of epochs, an RL training completion time, a case in which an indicator, such as a reward value or a loss function, shows a difference within or greater than or equal to a predetermined level, and an RL model confidence level.

The method further includes registering, to a network repository function (NRF), RL capability information including information indicating whether RL training is supported at NWDAF as an RL agent.

An NF that trains the RL model includes an NWDAF including a model training logical function (MTLF).

The NWDAF is selected based on criteria by the consumer NF from a plurality of NWDAFs registered as an RL agent in the NRF.

The criteria include RL capability information, a candidate action space, a state, an analytics ID of a machine learning (ML) model, whether an NWDAF, which is a selected RL agent, executes an RL procedure for a current analytics ID, a time period of interest, and a service area.

According to an embodiment, a device for supporting RL in a mobile communication system includes a processor, and a memory electrically connected to the processor and configured to store instructions executable by the processor, wherein the processor performs a plurality of operations when the instructions are executed by the processor, and the plurality of operations includes receiving a subscription request to train an RL model from a consumer NF, training the RL model by collecting data in response to the subscription request, and when training of the RL model is completed based on a training completion condition, transmitting a notification including RL model information to the consumer NF.

The subscription request includes parameters that the consumer NF is able to provide.

The parameters include an expected RL training completion time, an expected RL training completion condition other than time, an expected RL model confidence level, an expected reward, a candidate action space, an RL model update period, an RL preparation flag, an RL correlation ID, and an available data requirement.

The RL preparation flag is for identifying whether the subscription request is for preparing RL or executing RL, and the RL correlation ID is for identifying an RL procedure for RL model training.

The training completion condition includes at least one of the number of epochs, an RL training completion time, a case in which an indicator, such as a reward value or a loss function, shows a difference within or greater than or equal to a predetermined level, and an RL model confidence level.

The plurality of operations includes registering, to an NRF, RL capability information including information indicating whether RL training is supported at NWDAF as an RL agent.

An NF that trains the RL model includes an NWDAF including an MTLF.

The NWDAF is selected based on criteria by the consumer NF from a plurality of NWDAFs registered as an RL agent in the NRF.

The criteria include RL capability information, a candidate action space, a state, an analytics ID of an ML model, whether an NWDAF, which is a selected RL agent, executes an RL procedure for a current analytics ID, a time period of interest, and a service area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
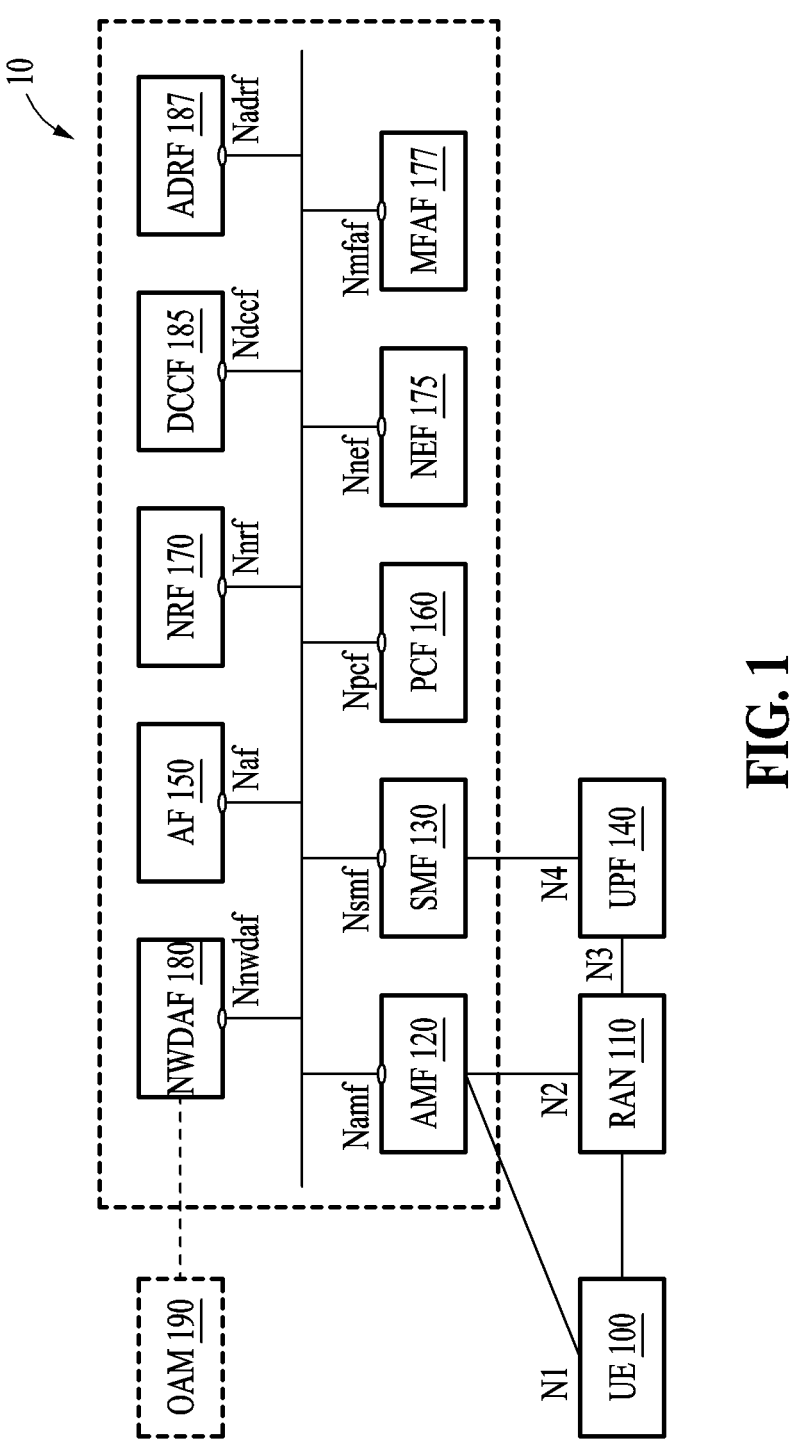
FIG. 1 is a diagram illustrating a network system according to one embodiment.

The following detailed structural or functional description is provided as an example only and various alterations and modifications may be made to the embodiments. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the embodiments with reference to the accompanying drawings, like reference numerals refer to like elements and a repeated description related thereto will be omitted.

Terms used herein to identify a connection node, to indicate network entities, to indicate messages, to indicate an interface among network entities, to indicate various pieces of identification information are examples for ease of description. Thus, terms are not limited to terms described later in this disclosure and other terms referring to a subject having the equivalent technical meaning may be used.

Herein, for ease of description, of the currently existing communication standards, terms and names defined by long-term evolution (LTE) and new radio (NR) standards, which are the latest standards defined by the third generation partnership project (3GPP) association, are used. However, embodiments described hereinafter are not limited to the terms and names and a system in compliance with other standards may be applicable in the same manner.

FIG. 1 is a diagram illustrating a network system according to one embodiment.

Referring to FIG. 1, according to one embodiment, a network system 10 (e.g., a 5G network system) may include a plurality of entities 100 to 190. User equipment (UE) (or a user terminal) 100 may be connected to a 5G core network via a radio access network (RAN) 110. The RAN 110 may be a base station providing a wireless communication function to the UE 100. An operation, administration, and maintenance (OAM) 190 may be a system for managing a terminal and a network.

A unit in which each function provided by the network system 10 may be defined as a network function (NF). The NF may include an access and mobility management function (AMF) 120, a session management function (SMF) 130, a user plane function (UPF) 140, an application function (AF) 150, a policy control function (PCF) 160, a network repository function (NRF) 170, a network exposure function (NEF) 175, a messaging framework adapter function (MFAF) 177, a network data analytics function (NWDAF) 180, a data collection coordination function (DCCF) 185, and an analytics data repository function (ADRF) 187. The AMF 120 may manage network access and mobility of a terminal, the SMF 130 may perform a function associated with a session, the UPF 140 may transmit user data, and the AF 150 may communicate with 5G core (5GC) to provide an application service. The PCF 160 may manage a policy, and the NRF 170 may store status information of an NF and may process a request to find an NF accessible by other NFs.

The NWDAF 180 may provide an analytics result by analyzing data collected in a network (e.g., a 5G network) to support network automation. The NWDAF 180 may collect and analyze information from the network. The NWDAF 180 may collect information from the OAM 190, an NF constituting the network, UE, or the AF 150. The NWDAF 180 may provide an analytics result to an NF, an OAM, UE, or an AF. The analytics result may be independently used by each NF, OAM, UE, or AF.

Figure 2:
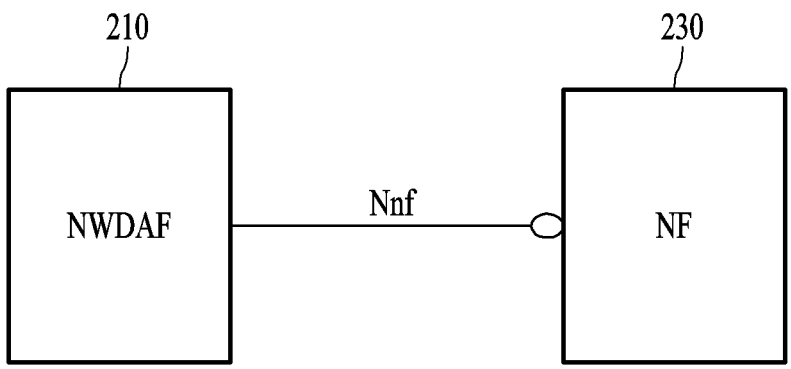
FIG. 2 is a diagram illustrating a network data analytics process according to one embodiment.

FIG. 2 is a diagram illustrating a network data analytics process according to one embodiment.

An NWDAF 210 may provide an analytics information subscription service (Nnwdaf_AnalyticsSubscription service) to an NF 230. The analytics information subscription service may allow to subscribe to or unsubscribe from a network data analytics result generated by the NWDAF 210. The analytics information subscription service may be divided into periodically receiving a network analytics result according to the needs of a network function of the NF 230 that subscribes to the service and receiving an analytics result when a predetermined condition is satisfied. The analytics information subscription service may be provided through three operations of subscribing, unsubscribing, and notifying.

The subscription operation (Nnwdaf_AnlayticsSubscription_Subscribe operation) may include a required input and/or an optional input. The required input may include a single network slice selection assistance information (S-NS-SAI), an event identifier (ID) or an analytics ID, a notification target address, and an event reporting information. The optional input may include information additionally required for analytics information processing. For example, the optional input may include information about an event filter or an analytics filter (or an analytics information filter). However, the example is not limited thereto.

In the case of subscription cancellation operation (Nnwdaf_AnlayticsSubscription_Unsubscribe operation), the NF 230 may transmit subscription ID information to the NWDAF 180 and the NWDAF 210 may transmit a message notifying confirmation of subscription cancellation to the NF 230 requesting subscription cancellation as an output.

The notification operation (Nnwdaf_AnlayticsSubscription_Notify operation) may be that the NWDAF 210 notifies the NF 230, which successfully subscribes to the analytics information subscription service, of a specified network data analytics result periodically or when a predetermined condition is satisfied. The notification operation may include an event ID or an analytics ID (or analytics information ID) and a notification target address.

The NWDAF 210 may provide an analytics information request service to the NF 230. Unlike the analytics information subscription service, the analytics information request service may be a service in which the NF 230 requests analytics on predetermined information and receives a result value as soon as the request is completed. An operation of the analytics information request service may include a request and a response. The NF 230 requesting the analytics information may transmit an analytics information request message to the NWDAF 180.

The NWDAF 210 may transmit an analytics result to the NF 230 that requested. The analytics result may be used to optimize the performance of an operation (or a network function) (e.g., quality of service (QoS) management, traffic control, mobility management, load balancing, and power management of a terminal) performed by the NF 230.

The NF 230 (e.g., the UE 100, the RAN 110, the AMF 120, the SMF 130, the UPF 140, the AF 150, the PCF 160, the NRF 170, the NEF 175, the MFAF 177, the DCCF 185, the ADRF 187, and/or the OAM 190 of FIG. 1) may be a consumer NF (or a user NF) that requests an analytics result from the NWDAF 210. The NF 230 may be a service consumer NF of the network data analytics service. The NWDAF 210 may collect data from the NF 230 and analyze the data to generate the analytics result requested by the consumer NF. The NWDAF 210 may transmit the analytics result to the consumer NF that transmitted the analytics request. Accordingly, the NWDAF 210 may be a provider NF of the analytics result requested by the consumer NF. The NWDAF 210 may be a service provider NF of a service that provides an analytics result requested by a service consumer NF.

The NWDAF 210 may include at least one of an analytics logical function (AnLF) and a model training logical function (MTLF). The NWDAF 210 may include both an MTLF and an AnLF, or may support both.

An NWDAF (e.g., the NWDAF 210) including an AnLF may perform inference and may derive analytics information (e.g., derive operation recommendation, statistics and/or predictions in response to an analytics consumer request). The NWDAF including the AnLF may expose a network data analytics service (e.g., Nnwdaf_AnalyticsSubscription or Nnwdaf_AnalyticsInfo).

An NWDAF (e.g., the NWDAF 210) including the MTLF may train a machine learning (ML) model (e.g., a reinforcement learning (RL) model) and may expose a new training service (e.g., provide an initial version that is not trained or a trained model).

A combination of an interoperability indicator and an analytics ID, which is able to indicate an interoperable MTLF, of the NWDAF may be set to the NWDAF including the AnLF or the MTLF to search for a trained ML model. The NWDAF including the AnLF may search for an NWDAF including the MTLF through an NRF using the interoperability indicator, an analytics ID, a required ML model provisioning service and a training service, and/or an ML model ID.

The NWDAF including the MTLF may search and select an NWDAF including an MTLF for RL. The NWDAF including the MTLF may perform RL training. The NWDAF including the AnLF may perform a recommendation operation by receiving RL model information from the MTLF.

When the NWDAF including the MTLF may be available to provide an ML model for an analytics ID and train, the NWDAF including the MTLF may register (e.g., register to the NRF) an ML model provisioning service and a training service (e.g., Nnwdaf_MLModelProvision, Nnwdaf_MLModelInfo, Nnwdaf_MLModelUpdate, Nnwdaf_MLModelTraining, and Nnwdaf_MLModelTrainingInfo).

Figure 3:
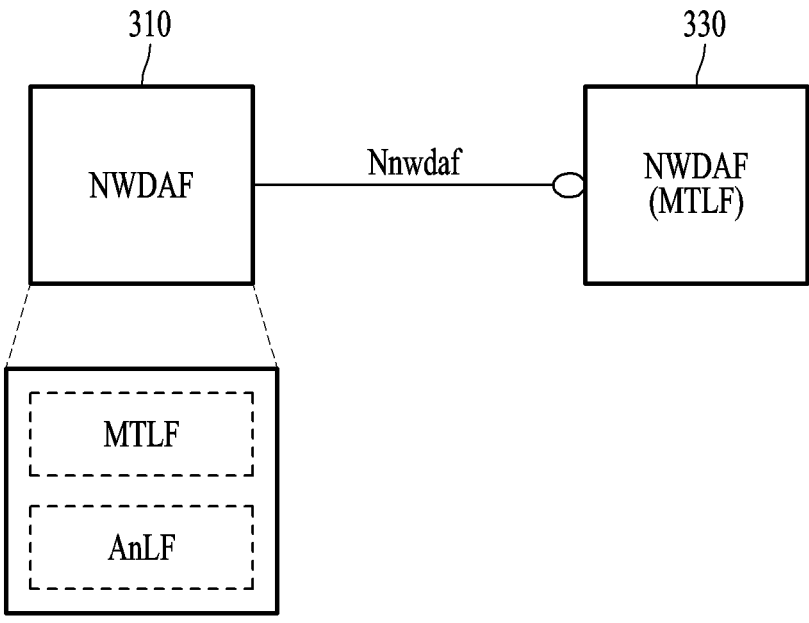
FIG. 3 is a diagram illustrating an operation of a network data analytics function (NWDAF) according to one embodiment.

FIG. 3 is a diagram illustrating an operation of a network data analytics function (NWDAF) according to one embodiment.

An NWDAF 310 may use a provisioning service operation and a training service operation for a trained ML model or an initial ML model that is not trained in an NWDAF 330. The NWDAF 310 may include at least one of an AnLF and an MTLF and the NWDAF 330 may include an MTLF. The ML model may include an RL model.

The AnLF may perform inference, may derive (e.g., derive operation recommendation, statistics and/or predictions in response to an analytics consumer request) analytics information, and may expose an analytics service (e.g., Nnwdaf_AnalyticsSubscription or Nnwdaf_AnalyticsInfo). The MTLF may train an ML model and may expose a new training service (e.g., provide a trained ML model and train an ML model).

The AnLF may support a data analytics information service (e.g., Nnwdaf_AnalyticsInfo) or an analytics subscription service (e.g., Nnwdaf_AnalyticsSubscription). The MTLF may support an ML model provisioning service (e.g., Nnwdaf_MLModelProvision), an ML model information request service (e.g., Nnwdaf_MLModelInfo), an ML model training service (e.g., Nnwdaf_MLModelTraining), and an ML model training information service (e.g., Nnwdaf_MLModelTrainingInfo).

An Nnwdaf interface may be used to request and subscribe to the ML model provisioning service wherein the ML model may be a trained ML model or an initial version that is not trained. The Nnwdaf interface may be used to request and subscribe to the ML model training service for ML model training including RL.

Figure 4B:
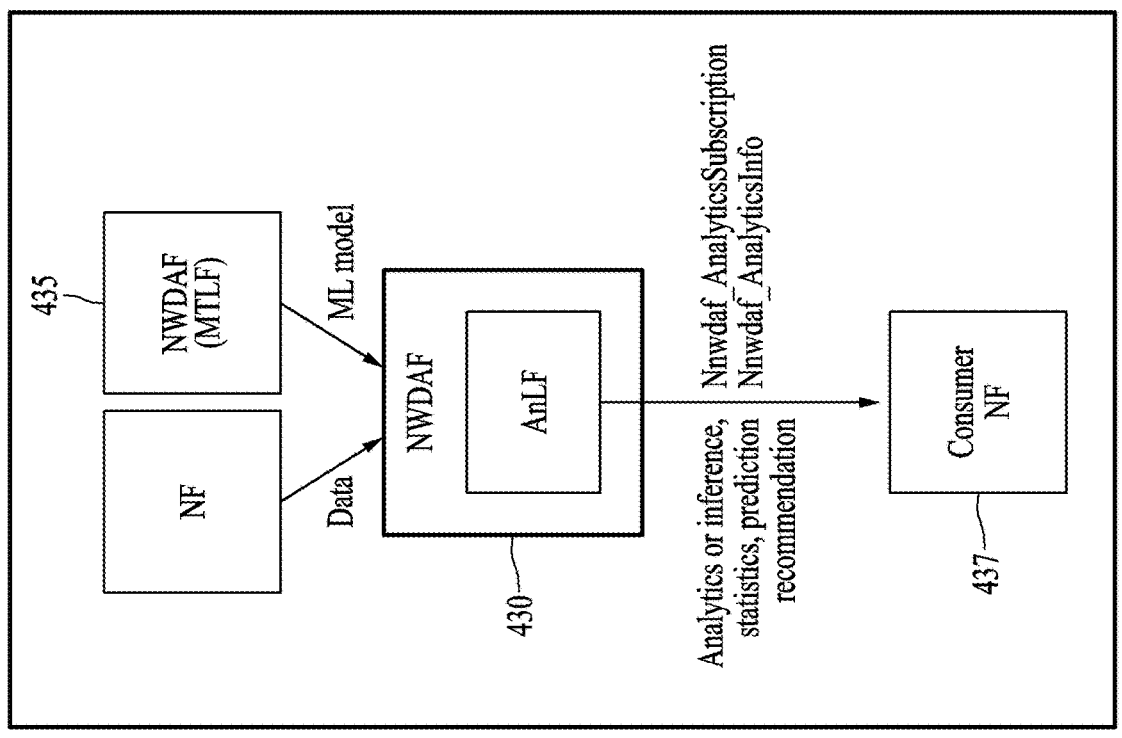
FIGS. 4A and 4B are diagrams illustrating a structure of an NWDAF according to one embodiment.
Figure 4A:
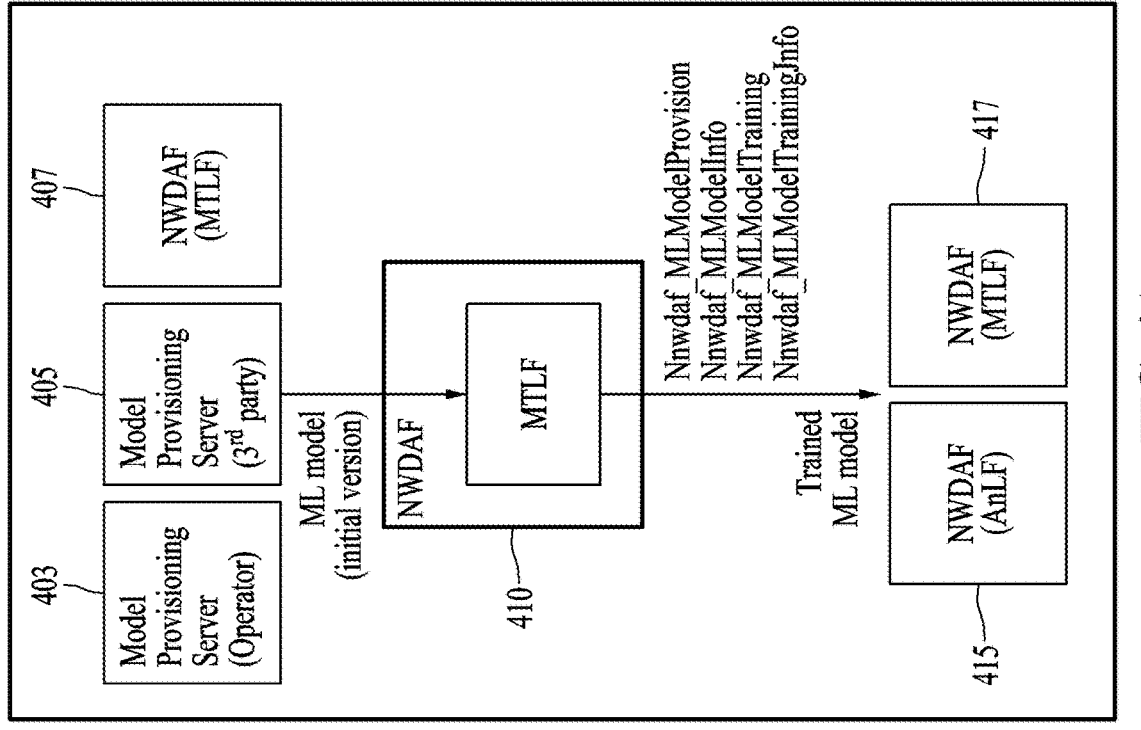

FIGS. 4A and 4B are diagrams illustrating a structure of an NWDAF according to one embodiment.

A description of an operation of an NWDAF 410 including an MTLF is provided with reference to FIG. 4A. The NWDAF 410 may receive an initial version of an ML model from a model provisioning server (operator) 403, a model provisioning server (third party) 405, or an NWDAF 407 including an MTLF. The ML model may include an RL model. After the NWDAF 410 trains the initial version of ML model, the NWDAF 410 may provide a trained ML model to an NWDAF 415 including an AnLF or an NWDAF 417 including an MTLF through an ML model provisioning service (e.g., an Nnwdaf_MLModelProvision service) or an ML model information service (e.g., an Nnwdaf_MLModelInfo service). In addition, to update an ML model, the NWDAF 410 may use an Nnwdaf_MLModelTraining service or an Nnwdaf_MLModelTrainingInfo service.

A description of an operation of an NWDAF 430 including an AnLF is provided with reference to FIG. 4B. The NWDAF 430 may collect data from a DCCF apparatus and/or a data source (e.g., an NF or an ADRF). The NWDAF 430 may receive an ML model from an NWDAF 435 including an MTLF. The NWDAF 430 may analyze collected data using an ML model. The NWDAF 430 may provide an analytics result of the data in the form of operation recommendation, statistics, or prediction to a consumer NF device 437.

Figures 5, 6:
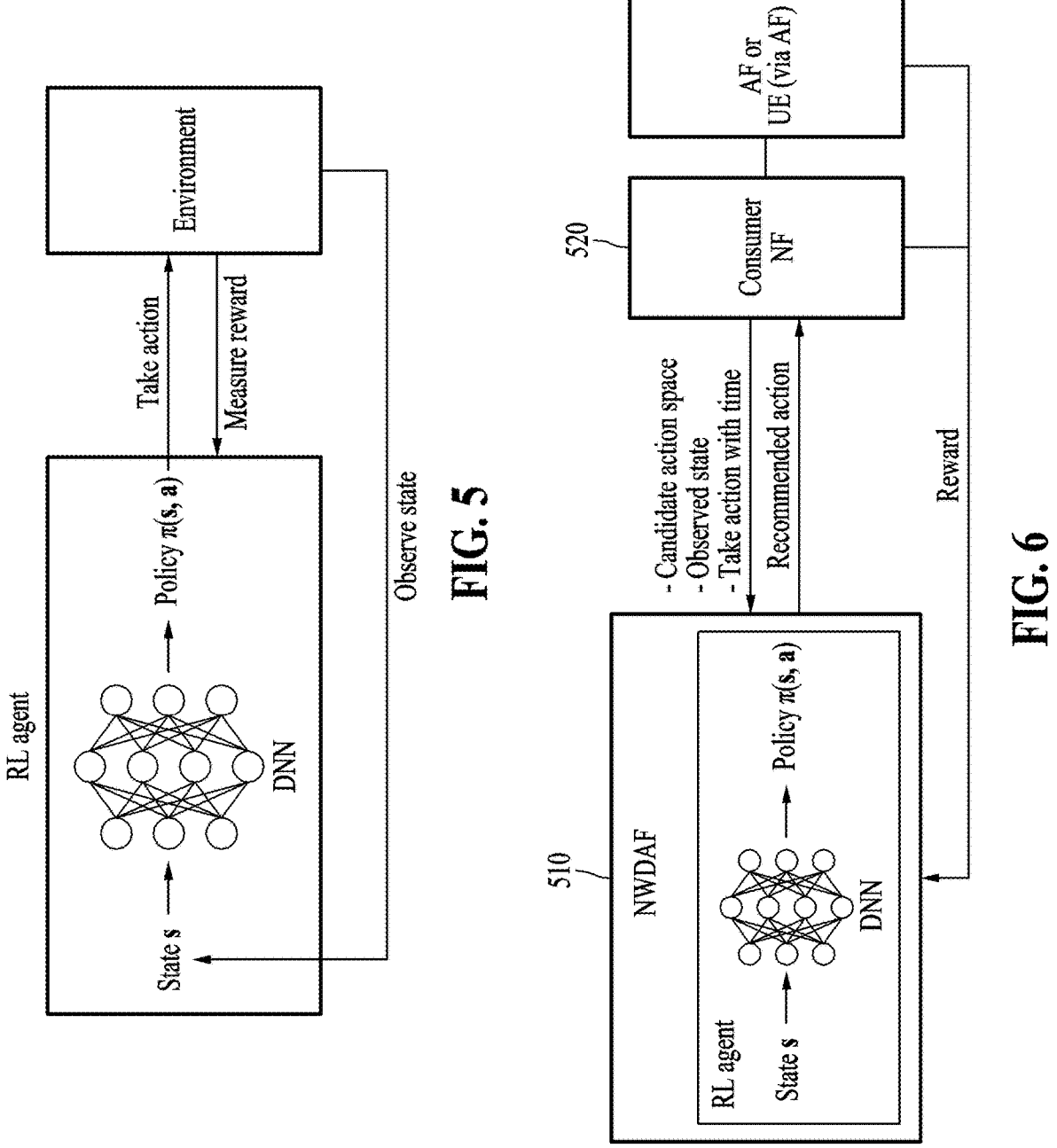
FIGS. 5 and 6 are conceptual diagrams illustrating reinforcement learning in a 5G core (5GC) according to one embodiment.

FIGS. 5 and 6 are conceptual diagrams illustrating reinforcement learning in a 5G core (5GC) according to one embodiment.

FIG. 5 illustrates a typical RL framework. The RL framework shown in FIG. 5 may not consider the characteristics and limitations of individual systems (e.g., 5GC). To implement an RL framework in a system, such as a 5GC, state, action, and reward functions, which are three components of the RL framework, may need to be defined according to a system environment.

One embodiment may relate to a method of supporting a recommendation capability for an action or a policy in a 5G system (5GS). The recommendation capability of the 5GS may be expected to enable 5GS automation. For the recommendation capability, unlike a conventional scheme that provides statistics and prediction based on a bulk of data, an action space in which a list of actions is defined for each given state and a reward function for an action taken for the given state may be required.

One embodiment may relate to a method of supporting RL by an NWDAF, which is the only NF with an AI/ML logic in the 5GC. The method of supporting RL may include a method of defining an action space, a method of defining a reward for a taken action, a method of managing a reward function, and how to exchange information and what information to exchange between a consumer NF and an NWDAF. However, the present disclosure does not exclude a case in which RL is performed internally in an NF. In this case, since the AI/ML logic is embedded in the NF, a portion of information to be transmitted from the consumer NF to the NWDAF may be obtained locally in the NF without transmitting the portion of information to the NWDAF.

FIG. 6 illustrates an example of implementing an RL framework in a 5GC according to one embodiment. A main entity involved in RL in the 5GC may be an NWDAF 510, a consumer NF 520, an AF (e.g., the AF 150 of FIG. 1), or UE (e.g., the UE 100 of FIG. 1) (via the AF). The NWDAF 510 may perform RL training since the NWDAF 510 is an NF with the AI/ML logic in the 5GC. An entity performing (or taking) an action may be the consumer NF 520. When an action is taken in the consumer NF 520, the state may basically include a state of the NF 520. The state in which the action is taken may be transmitted to the NWDAF 510 for training. When prevention of information leakage between different vendors is required, information on the taken action may not be explicitly transmitted to the NWDAF 510 from the NF 520 and may be replaced with an implicit scheme, such as an ID or a scalar value indicating the taken action without revealing the taken action. The AF or UE (via the AF) may provide the service quality to measure a reward at a service termination point at which the NWDAF 510 performs training. The consumer NF 520 may provide assistance information (e.g., local information of an NF, such as an expected NF load reduction) to measure a reward.

After the NWDAF 510 functioning as an RL agent receives necessary information (e.g., a candidate action space, an observed state, a taken action, and a reward) for RL from the consumer NF 520, the AF, or the UE (via the AF), the NWDAF 510 may generate and update a policy (in other words, defining a recommended way of behaving of the RL agent in a given state) based on the measured rewards.

Figure 7:
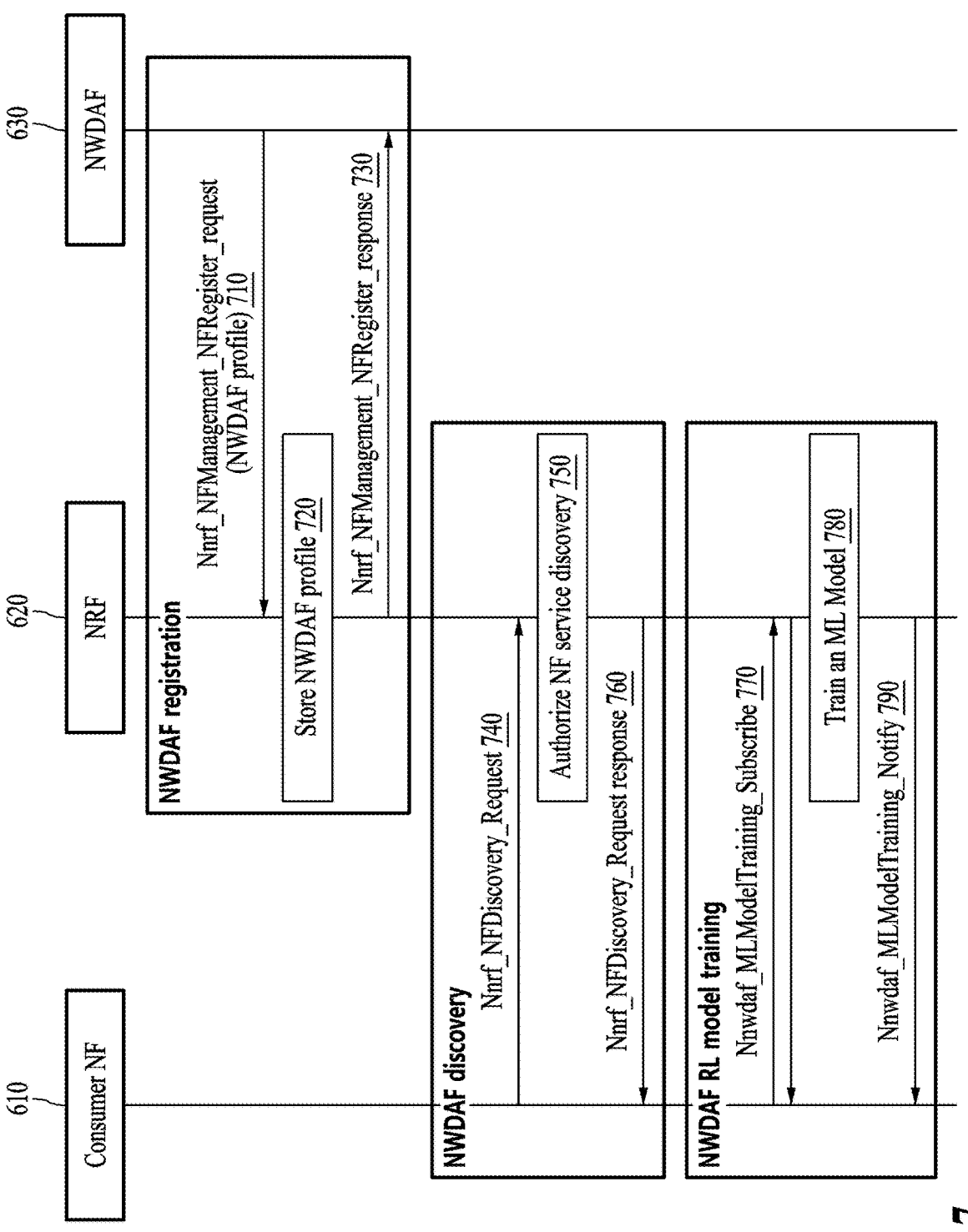
FIG. 7 is a flowchart illustrating a method of supporting reinforcement learning in a 5GC according to one embodiment.

FIG. 7 is a flowchart illustrating a method of supporting reinforcement learning in a 5GC according to one embodiment.

Operations 710 to 730 may relate to an NWDAF registration operation. In operations 710 to 730, an NWDAF 630 including an MTLF, which performs RL training as an RL agent, may register itself to an NRF 620 with an NF profile.

In operation 710, the NWDAF 630 may transmit a registration request (e.g., Nnrf_NFManagement_NFRegister_request) to the NRF 620. The registration request (e.g., Nnrf_NFManagement_NFRegister_request) may include the NF profile. For example, the NF profile may include RL capability information, an NWDAF NF type, an analytics ID, address information of the NWDAF, a service area, and a time interval of supporting RL. The RL capability information may include information indicating whether RL training is supported at NWDAF as an RL agent.

In operation 720, the NRF 620 may register the NWDAF 630 and the NF profile (e.g., the NF profile of the NWDAF 630). For example, the NRF 620 may store the NWDAF 630 and the NF profile.

In operation 730, after the NRF 620 registers the NWDAF 630 and the NF profile, the NRF 620 may transmit a response to the registration request of the NWDAF 630 to the NWDAF 630.

Although FIG. 7 illustrates that RL is supported by the NWDAF 630 including the MTLF, RL may be supported by a new NF dedicated to RL other than the NWDAF 630 including the MTLF.

The consumer NF 610 of FIG. 7 may be an AF (e.g., a trusted or untrusted AF). In the case of untrusted AF, an NEF may be involved in an operation between the untrusted AF and the 5GC (e.g., the NRF 620 of FIG. 7) as usual.

Operations 740 to 760 may relate to an NWDAF discovery operation. In operations 740 to 760, the consumer NF 610 as an NWDAF service consumer may find an NWDAF, which is an RL agent, in the NRF 620 and may select the NWDAF.

In operation 740, the consumer NF 610 may transmit, to the NRF 620, a request (e.g., Nnrf_NFDiscovery_Request) for finding the NWDAF, which is the RL agent, for RL model training.

In operation 750, the NRF 620 may find a plurality of candidate NWDAFs among a plurality of NWDAFs registered as an RL agent in the NRF 620 based on the request (e.g., Nnrf_NFDiscovery_Request) for finding the NWDAF.

In operation 760, the NRF 620 may transmit a response (e.g., Nnrf_NFDiscovery_response) to the request for finding the NWDAF to the consumer NF 610. The response (e.g., Nnrf_NFDiscovery_response) may include information on the plurality of candidate NWDAFs found in the NRF 620.

The consumer NF 610 may select an NWDAF (e.g., the NWDAF 630) from the plurality of candidate NWDAFs based on criteria. The NWDAF 630 may be an NWDAF that is appropriate for (or satisfies) the criteria. For example, the criteria may include the RL capability information, the candidate action space (e.g., an optional solution to prevent information leakage between different vendors may be applied, and an action information is implicitly expressed, such as a scalar value, rather than explicit action information), a state, an analytics ID of an ML model, whether the NWDAF, which is a selected RL agent, performs an RL procedure for a current analytics ID, a time period of interest, and a service area. The information on the plurality of candidate NWDAFs may include information mentioned in the criteria.

Operations 770 to 790 may relate to an NWDAF RL model training operation.

In operation 770, the consumer NF 610, which is an NWDAF service consumer, may request or modify a subscription to train the RL model.

For example, the consumer NF 610 may transmit a subscription request (e.g., Nnwdaf_MLModelTraining_Subscribe) to train the RL model to an NWDAF. The subscription request (e.g., Nnwdaf_MLModelTraining_Subscribe) may include parameters that the consumer NF is able to provide. The parameters that the consumer NF 610 is able to provide may include an expected RL training completion time, an expected RL training condition other than time, an expected RL model confidence level, an expected reward, a candidate action space, an RL model update period, an analytics ID, a notification target address (+a notification correlation ID), an RL preparation flag (e.g., to identify whether the subscription request is for preparing RL or executing RL), an RL correlation ID (e.g., to identify an RL procedure for RL model training), an available data requirement (e.g., to notify of an available data requirement for RL model training), an availability time requirement for informing the requirement on an availability time for RL model training), a maximum response time, and an expiry time. The available data requirement may include a list of event IDs to be collected for RL model training from the consumer NF 610, a different NF, a RAN, an OAM, an AF, or UE (via an AF).

The consumer NF 610 may identify whether the NWDAF is able to satisfy the RL model training requirement (e.g., the analytics ID and/or the availability of data and time) by using the subscription request (e.g., Nnwdaf_MLModel-Training_Subscribe). In this case, the consumer NF 610 may include the RL preparation flag in the subscription request (e.g., Nnwdaf_MLModelTraining_Subscribe). When the RL preparation flag is indicated in the subscription request (e.g., Nnwdaf_MLModelTraining_Subscribe), the NWDAF 620 may identify only whether the NWDAF 620 is able to satisfy the RL model training requirement.

When the consumer NF 610 determines to additionally update the RL model, the NWDAF 620 may modify subscription information using a subscription correlation ID.

In operation 780, the NWDAF 630 including the MTLF may train the RL model based on information of operation 770 by collecting data by itself or from another NF.

In operation 790, the NWDAF 630 may transmit a notification (e.g., Nnwdaf_MLModelTraining_Notify) including the RL model information to the consumer NF 610. For example, when the NWDAF completes the RL model training by satisfying a training completion condition, the NWDAF may notify the consumer NF of the RL model information. The training completion condition may include at least one of the number of epochs, an RL training completion time, a case in which an indicator, such as a reward value or a loss function, shows a difference within or greater than or equal to a predetermined level, and an RL model confidence level.

The notification (e.g., Nnwdaf_MLModelTraining_Notify) may include parameters that the NWDAF 630 is able to provide. The parameters that the NWDAF 630 is able to provide may include notification correlation information, the RL model information, an RL training state report including training input data information (e.g., an area covered by a data set, a sampling ratio, maximum and minimum values of each dimension value, etc.), an RL correlation ID, the number of epochs, a delay event notification with cause code for an RL agent to indicate that the preparation of the RL model is unable within a maximum response time provided by the consumer NF, and an expected time of service preparation. The RL model information may include an RL model file address (e.g., a uniform resource locator (URL) or a fully qualified domain name (FQDN)), an ADRF (set) ID, an RL model ID, an RL model storage transaction ID, and a model confidence level.

When the NWDAF 630 determines to terminate the RL model training, in other words, when the NWDAF 630 does not provide an additional notification related to the subscription request (e.g., NNnwdaf_MLModelTraining_Subscribe), the NWDAF 630 may notify the consumer NF 610 of a terminate request indication with cause code (e.g., NWDAF overload, RL process is no longer available, etc.).

The model confidence level as an output parameter of the NWDAF 630 may be locally derived by the NWDAF 630 or a separate entity (e.g., based on a digital twin model).

Operations 770 to 790 may be repeated whenever the consumer NF 610 requests a new RL task or a request of an existing RL task needs to be modified.

Figure 8:
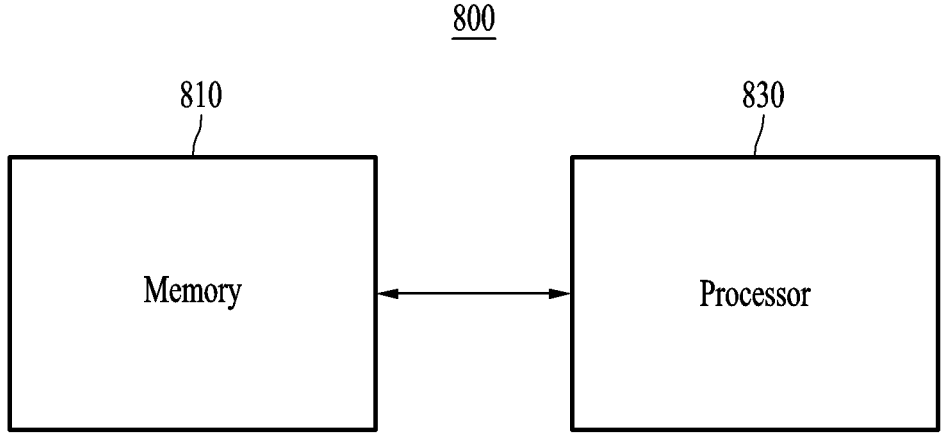
FIG. 8 is a schematic block diagram of a device supporting reinforcement learning (RL) according to one embodiment.

FIG. 8 is a schematic block diagram of a device supporting reinforcement learning (RL) according to one embodiment.

Referring to FIG. 8, according to one embodiment, a device 800 (e.g., a server device) supporting RL may be substantially the same as at least one of the NWDAF, the NRF, and the consumer NF described with reference to FIGS. 1 to 7. The device 800 may include a memory 810 and a processor 830.

The memory 810 may store instructions (or programs) executable by the processor 830. For example, the instructions may include instructions for performing the operation of the processor 830 and/or an operation of each component of the processor 830.

The memory 810 may be implemented as a volatile or non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (Fe-RAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

The processor 830 may execute computer-readable code (e.g., software) stored in the memory 810 and instructions (e.g., software) stored in the memory 810 and instructions triggered by the processor 830. The processor 830 may be a hardware-implemented data processing device having a circuit that is physically structured to execute desired operations. The desired operations may include code or instructions included in a program. For example, the hardware-implemented data processing device may include a microprocessor, a CPU, a processor core, a multi-core processor, a multiprocessor, an application-specific integrated circuit (ASIC), and a field-programmable gate array (FPGA).

The operation performed by the processor 830 may be substantially the same as at least one of the operations of the NWDAF, the NRF, and the consumer NF described with reference to FIGS. 1 to 7. Accordingly, a detailed description thereof is omitted.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of operating a device including a network data analytics function (NWDAF) that supports reinforcement learning (RL) in a mobile communication system, the method comprising:

receiving a subscription request to train an RL model from a consumer network function (NF);

training the RL model by collecting data in response to the subscription request; and when training of the RL model is completed based on a training completion condition, transmitting a notification comprising RL model information to the consumer NF, and wherein the subscription request comprises parameters that the consumer NF is able to provide, and wherein the parameters comprise an expected RL training completion time, an expected RL training completion condition other than time, an expected RL model confidence level, an expected reward, a candidate action space, an RL model update period, an RL preparation flag, an RL correlation identifier (ID), and an available data requirement.

2. The method of claim 1, wherein the RL preparation flag is for identifying whether the subscription request is for preparing RL or executing RL, and the RL correlation ID is for identifying an RL procedure for RL model training.

3. The method of claim 1, wherein the training completion condition comprises at least one of the number of epochs, an RL training completion time, a case in which an indicator, such as a reward value or a loss function, shows a difference within or greater than or equal to a predetermined level, and an RL model confidence level.

4. The method of claim 1, further comprising:

registering, to a network repository function (NRF), RL capability information comprising information indicating whether RL training is supported at the NWDAF as an RL agent.

5. The method of claim 1, wherein the NWDAF that trains the RL model comprises a model training logical function (MTLF).

6. The method of claim 5, wherein the NWDAF is selected based on criteria by the consumer NF from a plurality of NWDAFs registered as an RL agent in the NRF.

7. The method of claim 6, wherein the criteria comprise RL capability information, a candidate action space, a state, an analytics ID of a RL model, whether an NWDAF, which is a selected RL agent, executes an RL procedure, a time period of interest, and a service area.

8. A device including a network data analytics function (NWDAF) that supports reinforcement learning (RL) in a mobile communication system, the device comprising:

a processor; and a memory electrically connected to the processor and configured to store instructions executable by the processor, wherein the processor performs a plurality of operations when the instructions are executed by the processor, and the plurality of operations comprises:

receiving a subscription request to train an RL model from a consumer network function (NF);

training the RL model by collecting data in response to the subscription request; and when training of the RL model is completed based on a training completion condition, transmitting a notification comprising RL model information to the consumer NF, and wherein the subscription request comprises parameters that the consumer NF is able to provide, and wherein the parameters comprise an expected RL training completion time, an expected RL training completion condition other than time, an expected RL model confidence level, an expected reward, a candidate action space, an RL model update period, an RL preparation flag, an RL correlation identifier (ID), and an available data requirement.

9. The device of claim 8, wherein the RL preparation flag is for identifying whether the subscription request is for preparing RL or executing RL, and the RL correlation ID is for identifying an RL procedure for RL model training.

10. The device of claim 8, wherein the training completion condition comprises at least one of a number of epochs, an RL training completion time, a case in which an indicator, such as a reward value or a loss function, shows a difference within or greater than or equal to a predetermined level, and an RL model confidence level.

11. The device of claim 8, wherein the plurality of operations comprises:

registering, to a network repository function (NRF), RL capability information comprising information indicating whether RL training is supported at the NWDAF as an RL agent.

12. The device of claim 8, wherein the NWDAF that trains the RL model comprises a model training logical function (MTLF).

13. The device of claim 12, wherein the NWDAF is selected based on criteria by the consumer NF from a plurality of NWDAFs registered as an RL agent in the NRF.

14. The device of claim 13, wherein the criteria comprise RL capability information, a candidate action space, a state, an analytics ID of a RL model, whether an NWDAF, which is a selected RL agent, executes an RL procedure, a time period of interest, and a service area.

* * * * *